Feb. 1, 1966 J. H. DEICHEN 3,233,197
POTENTIMETER ARRANGEMENT FOR CONTROLLING THE FREQUENCY OF VARIABLE FREQUENCY OSCILLATORS
Filed Nov. 13, 1963
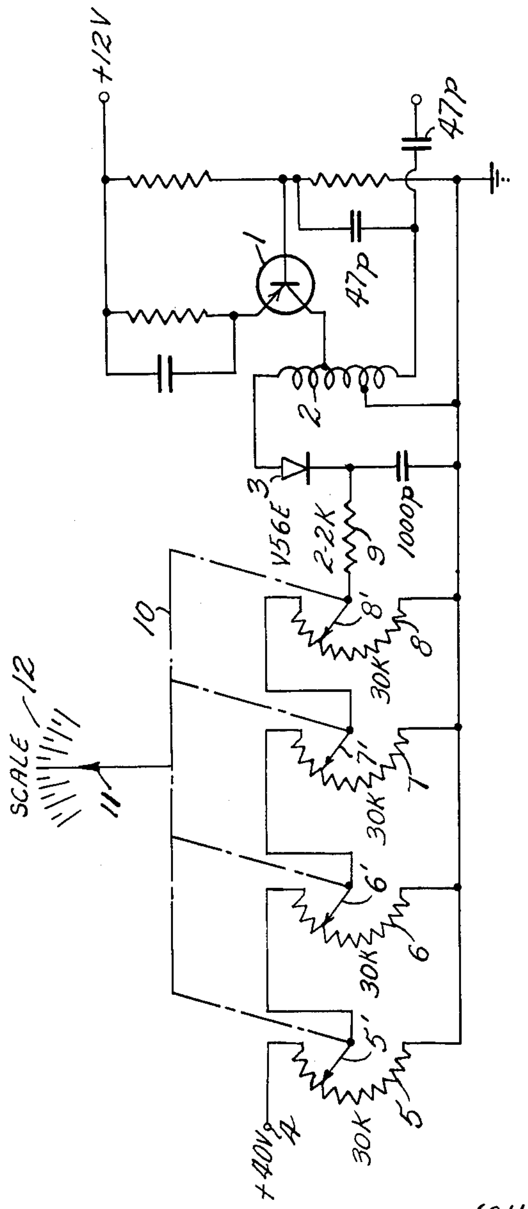
INVENTOR
JOHN HENRY DEICHEN
BY Baldwin & Wight
ATTORNEYS United States Patent Office 3,233,197

Patented Feb. 1, 1966

3,233,197

POTENTIOMETER ARRANGEMENT FOR CONTROLLING THE FREQUENCY OF VARIABLE FREQUENCY OSCILLATORS

John Henry Deichen, Bushey, England, assignor to Marconi Instruments Limited, London, England, a British company Filed Nov. 13, 1963, Ser. No. 323,296
Claims priority, application Great Britain, Nov. 21, 1962, 43,968/62
3 Claims. (Cl. 334—15)

This invention relates to variable frequency oscillators and more particularly, though not exclusively, to frequency-calibrated oscillators for use in test sets for measuring and testing radio and similar equipment.

The usual test set oscillator includes a frequency determining calibrated parallel tuned circuit comprising an inductance and a condenser in parallel, the inductance being usually fixed (for a given frequency range) and the condenser being variable to vary the frequency over the range by means of a control handle with an indicator moving over a scale which is calibrated in frequency. Any of a variety of well known expedients may be used where more than one range is required, e.g. the inductance may be interchangeable in circuit with other inductances of different values or a tapped inductance in conjunction with a range-changing switch may be used. It is, of course, well known to constitute a variable condenser by the capacitance of a semi-conductor diode to which a suitably chosen D.C. voltage is applied, varying the value of the capacitance by varying the applied voltage. This type of condenser—i.e. one constituted bf a semi-conductor diode—is very convenient and advantageous for use as the variable tuning condenser of a test or like oscillator, in part because a condenser of this type can be made very small and compact as compared with an ordinary condenser of the moving vane type and in part because control of its capacitance by controlling the voltage applied thereto is effectable by a device, such as a potentiometer, which, with its connections, only carries D.C. voltage and current. Accordingly the control element proper—the potentiometer—can be put without difficulty wherever is most convenient and can be connected to the controlled element—the diode—through quite long leads. However, the relationship between applied voltage and diode capacitance in a variable condenser of this type is far from linear, approximating in fact to a square law relationship. Since the resonant frequency of a parallel tuned circuit is proportional to the square root of the product of the inductance and capacitance thereof, the relationship between the voltage applied to the diode-condenser and the resonant frequency of the tuned circuit approximates to a fourth power law with the result that if an ordinary linear potentiometer in conjunction with a fixed voltage source is employed to provide the capacitance-varying voltage for the diode, and the potentiometer is required to be fitted with an indicator reading on a calibrated scale, the said scale is unsatisfactory in that it is a corresponding power law scale whereas, in practice, an at least approximately linear scale is usually desired.

According to a feature of this invention a variable frequency oscillator comprises a variably tunable frequency determining resonant circuit the variable tuning reactance in which is constituted by the capacitance of a semi-conductor diode, and means for applying a variable D.C. voltage to said diode to vary the capacitance thereof, said means including a non-linear potentiometer arrangement adapted to be connected to a source of fixed D.C. potential and to derive therefrom a variable D.C. potential which is applied to the diode, the said potentiometer arrangement being so constructed and dimensioned that a given amount of adjustment thereof produces at least approximately the same change in resonant frequency of said resonant circuit over the whole range of adjustment.

Preferably the non-linear potentiometer arrangement comprises four similar gang-controlled linear potentiometers in cascade with the resistance of successive potentiometers connected between the slider of the preceding potentiometer and one end of the resistance thereof, means being provided for applying the fixed D.C. potential of the source across the resistance of the first potentiometer and the potential applied to the diode being taken from the slider of the fourth potentiometer. This very simple arrangement is practically very advantageous for although it employs linear potentiometers of ordinary construction without specially wound resistances, a sufficiently close approximation to a linear relationship between control adjustment and tuned circuit resonant frequency is obtained. In the preferred arrangement the sliders of the four potentiometers are operated by the same shaft which carries a pointer moving over a calibrated scale. This scale will be a satisfactorily open one and sufficiently near a uniform scale to be practically very desirable.

In some more or less special cases an approximation to a power law relationship other than a fourth power law relationship may be required between voltage applied to the diode and adjustment of the potentiometer arrangement—for example a cube law may be required. This may be achieved by a modification or extension of the invention.

According to a modified feature of this invention a variable frequency oscillator comprises a variably tunable frequency determining resonant circuit the variable tuning reactance in which is constituted by the capacitance of a semi-conductor diode; a non-linear potentiometer arrangement comprising a plurality of ganged linear potentiometers in cascade each, except the first, having its resistance connected between the slider of, and one end of the resistance of, the immediately preceding potentiometer; means for applying voltage from the slider of the last potentiometer to the diode; and means for applying voltage from a source of D.C. potential across the resistance of the first potentiometer.

Preferably the active element of the oscillator is a transistor.

The invention is illustrated in the accompanying drawing which is a diagram of a preferred oscillator embodiment which will give an acceptably close approximation to a linear relationship between adjustment of the frequency controlling handle thereof and frequency of oscillation. In the drawing practical values of voltages, capacitances and resistances are given. These values were found satisfactory in an experimentally tested circuit in which the variable capacitance diode was one known under the trade designation V56E. These values are, of course, exemplary only and in no sense limiting.

Referring to the drawing, the variable frequency oscillator therein represented comprises as its active element a transistor 1 connected in an oscillation circuit which is known per se and requires no further description here. This circuit includes a fixed inductance 2 and a variable capacitance constituted by the capacitance of a semiconductor diode 3. This capacitance is varied by varying the potential applied to the said diode 3.

The variable potential applied to the diode 3 is derived from a D.C. source (not shown) connected at terminal 4, and is varied by a potentiometer arrangement consisting of four similar linear potentiometers ganged together, e.g. having their sliders adjusted by the same control shaft. The first of the four potentiometers comprises resistance 5 and slider 5', the second comprises resistance 6 and slider 6', the third comprises resistance 7 and slider 7', and the fourth comprises resistance 8 and slider 8'. Terminal 4 is connected to one end of resistance 5 and slider 5′ is connected to the corresponding end of resistance 6, the slider 6′ on which is connected to the corresponding end of resistance 7, whose slider 7′ is connected to the corresponding end of resistance 8. The slider 8′ is connected to the diode through a suitable fixed resistance 9. The four sliders 5′, 6′, 7′ and 8′ are adjustable up and down together, the ganged control being conventionally represented by the chain line 10. With this simple arrangement the relationship between movement of the sliders 5′, 6′, 7′ and 8′ and the frequency of the tuned circuit comprising the elements 2 and 3 is approximately linear. The ganged control 10 is fitted with the usual indicating pointer 11 reading on calibrated scale 12. If, as may occur in certain special cases, a square, cube or other power law relationship is required between adjustment control and frequency of oscillation, this can be obtained by providing two, three, or more similar linear potentiometers connected in cascade in the same way as that in which the two potentiometers shown are in cascade.

I claim:

1. A variable frequency oscillator comprising a variably tunable frequency determining resonant circuit the variable tuning reactance in which is constituted by the capacitance of a semi-conductor diode; a non-linear potentiometer arrangement comprising a plurality of ganged linear potentiometers in cascade each, except the first, having its resistance connected between the slider of, and one end of the resistance of, the immediately preceding potentiometer; means for applying voltage from the slider of the last potentiometer to the diode; and means for applying voltage from a source of D.C. potential across the resistance of the first potentiometer.

2. A variable frequency oscillator comprising a variably tunable frequency determining resonant circuit, the variable tuning reactance in which is constituted by the capacitance of a semi-conductor diode; and means for applying a variable D.C. voltage to said diode to vary the capacitance thereof; said voltage applying means including a non-linear potentiometer arrangement adapted to be connected to a source of fixed D.C. potential and to derive therefrom a variable D.C. potential which is applied to the diode; said potentiometer arrangement being so constructed and dimensioned that a given amount of adjustment thereof produces at least approximately the same change in resonant frequency of said resonant circuit over the whole range of adjustment; and said potentiometer arrangement comprising four similar gang-controlled linear potentiometers in cascade, with the resistances of the second, third, and fourth potentiometers connected between the slider of their respective immediately preceding potentiometer and one end of the resistance thereof, means being provided for applying the fixed D.C. potential of the source across the resistance of the first potentiometer and the potential applied to the diode being taken from the slider of the fourth potentiometer.

3. An oscillator as claimed in claim 2 wherein the sliders of the four potentiometers are operated by the same shaft which drives a calibrated scale indicating arrangement.

References Cited by the Examiner

UNITED STATES PATENTS 3,109,995 11/1963 Wargo ............. 331—177

OTHER REFERENCES

Silverman, CQ, February 1961, pages 40–42.

ROY LAKE, *Primary Examiner.*

JOHN KOMINSKI, *Examiner.*